July 26, 1966
C. C. EHLKE ETAL
3,262,525
PEDAL ACTUATED STEERING CLUTCH AND BRAKE
CONTROLS FOR TRACTORS
Filed April 28, 1964
2 Sheets-Sheet 2
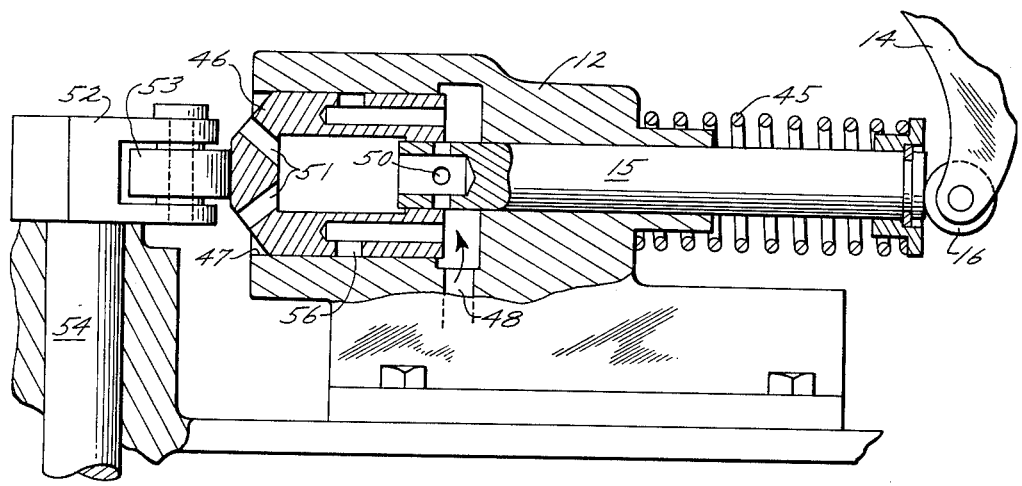
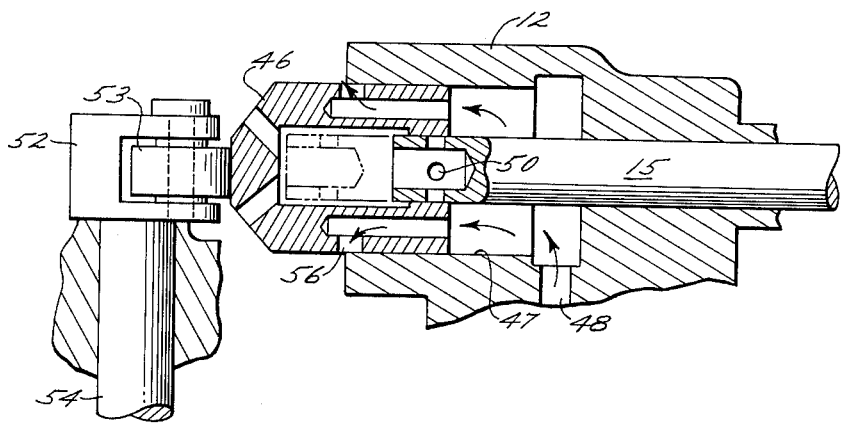
INVENTORS
CHARLES C. EHLKE
DONALD K. STROHSCHEIN
BY  JOHN W. YANCEY
Fryer and Tjensvold
ATTORNEYS 3,262,525
PEDAL ACTUATED STEERING CLUTCH AND BRAKE CONTROLS FOR TRACTORS
Charles C. Ehlke and Donald K. Strohschein, Naperville, and John W. Yancey, East Peoria, Ill., assignors to Caterpillar Tractor Co., Peoria, Ill., a corporation of California
Filed Apr. 28, 1964, Ser. No. 363,241
4 Claims. (Cl. 192—13)

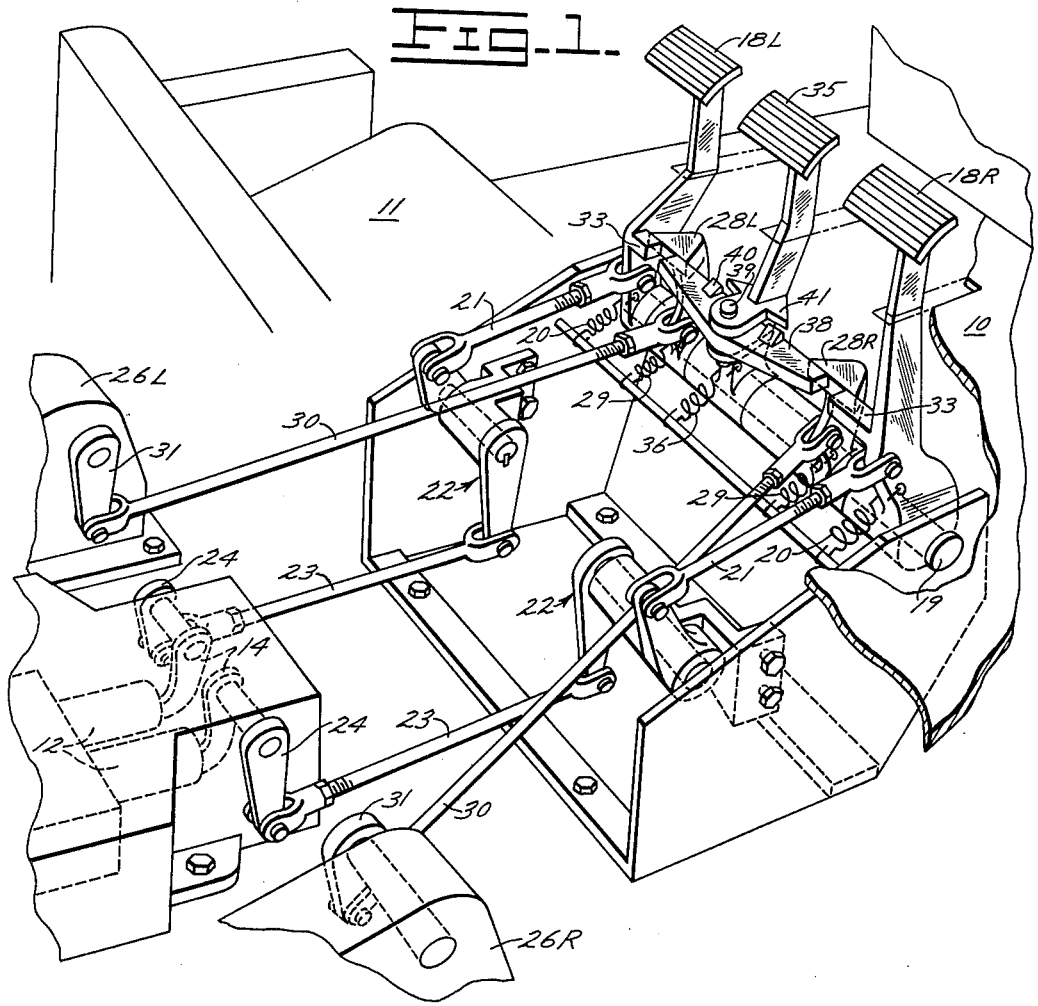

This invention relates to the steering of tractors and particularly to steering entirely by pedal actuated controls, of the type of tractor which is designed for steering by driving or by braking.

In track-type tractors and some wheel-type tractors steering is accomplished by interrupting the drive to the drive wheel or sprocket on one side or the other of the tractor and may also be accomplished by applying a brake selectively to the right or left drive component. Conventionally the steering clutch controls of such tractors are operable by hand levers and the steering brake controls include foot pedals.

In the operation of present day tractor mounted equipment such as bulldozers and bucket loaders, various hand controls such as hydraulic valves require actuation and it is desirable that driving and steering be accomplished as much as possible by pedal controls to free the hands of the operator for efficient operation of various machine attachments.

It is, therefore, an object of the present invention to provide a tractor, the steering of which may be accomplished entirely through pedals.

A further object of the invention is to provide steering controls for a tractor including two pedals, each of which is operable to release a steering clutch on one side of the tractor and to apply a steering brake on the same side of the tractor.

A further object of the invention is to provide a tractor with such pedal operated steering clutch and brake actuating mechanisms in which the pedals are operable for gradual release of the clutches and application of the brake only after complete clutch release or in which the pedals may be actuated to effect quick clutch release and quick application of the brakes for fast steering.

A further object of the invention is to provide a single pedal for operation of both steering brakes simultaneously with equal pressure and without releasing the clutches.

Still further and more specific objects and advantages of the invention and the manner in which the invention is carried into practice are made apparent in the following specification wherein reference is made to the accompanying drawings.

In the drawings:

FIG. 1 is a fragmentary perspective view with parts broken away and parts in section illustrating steering controls embodying the present invention;

FIG. 2 is an enlarged sectional view of an hydraulic servo which forms a part of the invention illustrated in FIG. 1; and FIG. 3 is a view like FIG. 2 illustrating the parts of the servo in different positions.

An operator's station of a tractor is illustrated in FIG. 1 as comprising a deck 10 and a seat 11 with foot pedals arranged as shown within convenient reach of an operator in the seat. Right and left steering clutches of the tractor (not shown) are operable by a pair of steering clutch valves 12, shown in broken lines in FIG. 1, one of which is also shown in FIGS. 2 and 3. Each steering clutch valve is actuated by engagement of a lever 14 with the end of a plunger 15 (see FIG. 2) through the medium of an anti-friction roller 16.

A pair of brake and clutch pedals 18L and 18R is employed to actuate the left and right clutch valves, respectively, and also to actuate left and right brakes as will presently be described in detail. The linkage between the pedals and the clutch valves is substantially identical on the left and right hand side and comprises first a shaft 19 supporting the pedals for pivotal movement and springs 20 arranged to urge the pedals toward retracted positions. Links 21 form connections between the pedals and bellcrank assemblies, generally indicated at 22, and links 23 connect the bellcrank assemblies to crank arms 24 on shafts which support the levers 14 which actuate the plungers 15. Consequently depression of either of the pedals 18 will actuate the corresponding clutch valve to disengage the selected clutch for effecting steering of the tractor.

Left and right hand steering brakes of conventional type are contained in housings 26L and 26R are operable by the same pedals 18L and 18R only after disengagement of the corresponding clutches. The brakes are adapted to be applied by brake levers 28L and 28R pivoted on the shaft 19 and retracted as by springs 29. These levers are connected by links 30 with brake actuating levers 31 capable of applying the brakes contained in the housings 26L and 26R by conventional mechanism the construction of which is not necessary to an understanding of the present invention. Each of the clutch and brake pedals 18L and 18R is provided with a lug 33 which upon depression of either pedal engages the corresponding brake lever 28L and 28R. The brake levers cause application of the brakes after taking up lost motion in the brake mechanism and permitting initial disengagement of the clutches through the steering clutch valves 12 in a manner presently to be described in detail.

It is also desirable that both brakes be capable of application simultaneously and independently of the steering clutches and this is accomplished by a third pedal 35 disposed intermediate the pedals 18L and 18R and also pivotally supported on the shaft 19 and urged toward a retracted position by a spring 36. This pedal carries an equalizing bar 38 pivoted as at 39 to brackets on the pedal and extending outwardly to engage both of the pedal actuating levers 28L and 28R. It is obvious that depression of the pedal 35 will effect application of both of the steering brakes and since the equalizing bar is pivoted, the force applied to the brakes is equalized to avoid excessive wear on either brake. Pivotal movement of the equalizer bar is limited by lugs 40 and stops 41. The brake pedal 35 may be employed to stop the tractor when its motion is being controlled by a main clutch in association with the tractor transmission rather than by the steering clutches. This brake pedal is therefore useable in accurately positioning the tractor when an implement such as a blade or bucket is being poised for a given operation and the tractor may in such cases be brought to a halt with the operation of one foot while the operator's hands are occupied with other controls.

The construction of the steering clutch valves which enables operation of the pedals 18L and 18R to first disengage the clutches and then apply the brakes is best illustrated in FIGS. 2 and 3. In these figures, each valve is shown as having a reciprocable plunger 15 normally retracted as by a spring 45. The inner end of the plunger is slidably arranged in a central bore of a piston 46 reciprocably disposed in a bore 47 in the housing. Fluid under pressure from a source (not shown) which may be the lubricating oil system of the tractor engine is introduced through a port 48 to the space behind the piston 46 and is normally vented through ports 50 in the plungers and ports 51 in the forward end of the piston 46.

Upon depression of one of the pedals 18L or 18R to disengage its corresponding clutch, the plunger 15 is advanced until the ports 50 therein are closed by entering the bore in the piston (see FIG. 3) and consequently pressure builds up behind the piston to advance it. This actuates a lever 52 with an anti-friction roller 53 thereon and rotates a shaft 54 to effect clutch disengagement through conventional mechanism (not shown). Upon complete clutch disengagement, relief ports 56 in the walls of the piston 46 extend beyond the end of the housing 12 to relieve pressure as in the position shown in FIG. 3, thus preventing further actuation of the clutch disengaging leverage. From this position, which represents approximately three inches of travel of the actuating pedals 18L and 18R, further pedal movement is required to effect actuation of a brake. This further pedal movement which is accompanied by further swinging movement of the valve actuating lever 14 is made possible by providing space in the piston 46 into which the plunger 15 may travel without changing the condition of the steering clutches ordinarily controlled by its movement. Thus the plunger may travel to the dotted line position illustrated in FIG. 3 where its inner end is received within the hollow interior of the piston 46 so that the brakes may be applied after clutch disengagement and while the clutches are retained in their disengaged positions.

We claim:

1. In a tractor which has steering clutches and steering brakes, the combination comprising: actuating members for said clutches and brakes, linkage to release one clutch upon actuation of one member and to apply the corresponding brake upon further actuation of said one member, and similar linkage between the other clutch and brake and the other member, a third member and means operable upon actuation of said third member to apply both brakes only.

2. The combination of claim 1 in which the linkages between the one and the other members include hydraulic valves and means in said valves to permit the further member actuation for applying the brakes after release of the clutches.

3. In a tractor which has steering clutches and steering brakes, the combination comprising: actuating pedals for said clutches and brakes, linkage to release one clutch upon depression of one pedal and to apply the corresponding brake upon further depression of said one pedal, similar linkage between the other clutch and brake and the other pedal, a third pedal, and means operable upon depression thereof to apply both brakes only.

4. The combination of claim 3 in which the linkages between the pedals and the clutches include hydraulic valves and means in said valves to permit the further pedal depression for applying the brakes after release of the clutches.

References Cited by the Examiner

UNITED STATES PATENTS

| | | | |
|---|---|---|---|
| 1,973,826 | 9/1934 | Schweering | 192—13 |
| 2,433,443 | 12/1947 | Edge. | |
| 2,597,109 | 5/1952 | Kropp | 74—478 |
| 2,669,330 | 2/1954 | Banker. | |
| 2,989,875 | 6/1961 | Torrance | 74—478 |
| 3,068,976 | 12/1962 | Melley | 192—13 |

DAVID J. WILLIAMOWSKY, *Primary Examiner.*

BENJAMIN W. WYCHE III, DON A. WAITE,
*Examiners.*